July 25, 1967  J. H. ARMSTRONG ET AL  3,332,693
COLLET AND HOLDER

Filed July 10, 1964  2 Sheets-Sheet 1

INVENTORS.
JOHN H. ARMSTRONG &
PHILIP D. GOLRICK
BY Philip D. Golrick
ATTORNEY

*INVENTORS.*
JOHN H. ARMSTRONG &
PHILIP D. GOLRICK
BY
*Philip D. Golrick*
ATTORNEY United States Patent Office 3,332,693
Patented July 25, 1967

3,332,693
COLLET AND HOLDER
John H. Armstrong, Brecksville, Ohio (199 Ledge Road, Northfield, Ohio 44067), and Philip D. Golrick, Cleveland Heights, Ohio; said Golrick assignor to said Armstrong
Filed July 10, 1964, Ser. No. 381,680
20 Claims. (Cl. 279—47)

The present invention relates generally to the art of chucks, and more particularly to the combination of a collet and collet holder. More particularly the invention may be considered under one aspect to be an improvement of the type of collet holder disclosed in the U.S. Patents 2,885,210 and 2,885,211, though having application at least as to certain features for other types of collets and collet holders.

For precisely chucking or gripping objects, particularly rotary cutting tools with a shank, though at times cylindrical stock as a work piece, collet type devices have now been long used in a considerable variety. For a machine tool of general use, that is not designed for a specific tool, or having a permanent collet holder intended to use but one collet, generally a collet holder is secured in the machine tool spindle to chuck the required tool. The collet holder itself commonly is adapted to receive a series of collets of different bore diameters corresponding to different tool shank sizes which may be used in the machine. Today the most widely used form of collet for this purpose has a long main external body taper seated in a correspondingly shaped coaxial collet holder socket, and a blunter nose taper circumferentially contacted by a collet holder nut threaded onto the holder body to apply to the collet an axially directed force seating the collet in a wedging relation and a circumferentially applied radial collet constricting force for gripping of a tool shank or other object held therein, whereby a rotational driving engagement is obtained from the holder to the tool. Generally a ring element is interposed between the locking nut and the collet to obtain a more even pressure distribution on the collet.

Since in such arrangements as that shown in the above mentioned patents it is necessary to completely remove the locking nut from the collet body, then remove the collet from the holder and substitute the new collet, and subsequently assemble the ring and nut and again screw the locking nut onto the body, there is inherent a certain loss of time, both machine down time and labor time, which advantageously could be reduced were the necessity of removal of the nut from the body eliminated.

Further where a self-releasing arrangement is used to extract a collet having a sticking taper from seated relation, as in the aforementioned patents, additional components are involved in the collet holder structure, requiring handling in the collet change, as for example, an ejector or collar extractor ring interposed between the locking nut and the collet to act on the latter as the nut is backed off. Such additional parts or components are advantageously eliminated, at least as separate elements, from the viewpoint both of simplicity of structure and—with consequent time saving in collet changes—of manipulation in the collet change.

By the present invention there is provided a form of pressure ring and cooperating locking nut which permit removal of the locking ring structure and collet through the nut opening after the nut is merely backed off enough to free the collet from its seat, and thereafter reinsertion of a new collet with applied ring. For this purpose the nose or front opening of the collet nut is provided with a non-circular opening, and the collet pressure ring element at least at its back portion with a corresponding non-circular rim or periphery receivable through the nut opening, the nut and pressure ring forms being such that upon a relative rotational or angular shift a plurality of equispaced radial areas or shoulder regions of nut and ring element come into what might be called in broad sense axial alignment, preferably with stop means provided between the two elements for holding the same at such alignment relation as the nut is threaded further onto the holder body.

Further according to the invention, for handling collets having a sticking taper there is associated in one ring structure not only the aforementioned pressure ring function but also an extractor ring function. This is achieved in one embodiment of the invention by providing in the component serving as a pressure ring, which has therefore an inside taper corresponding generally to the nose taper of the collet, also a reverse taper at its back end. In effect there is formed at the juncture of the two tapers an annular groove circumferentially embracing or receiving what might be called the girdle of the collet, that is, the region of intersection of the nose and main body taper having a maximum diameter. There are further then provided shoulder formations between the nut and ring component adapted for engagement as the nut is backed off whereby an axial motion is imparted to the collet to move it out of seated engagement. The same result is attained by other embodiments of the invention hereinafter described in detail.

It is a general object of the present invention to provide in a collet and colllet holder combination of the type described a structure which permits the change of collet through the locking nut without need of removal of the nut from the collet holder body. Another general object of the invention is to provide a structure in a collet holder whereby a marked time reduction is obtainable in the collet changing operations. Another object is the provision of such structure as permits the insertion and removal of a collet through the locking nut. A still further object is the provision of structure of the character described adapted for a self-releasing action between collet and collet holder wherein the function of a collet tightening pressure ring and collet releasing or extractor ring are embodied in a single component. A still further object is the provision of a collet holder structure wherein the means providing both pressure ring and extracting ring functions and the collet are removable from and insertable through the collet locking nut without need of removal of the latter in making collet changes.

Other objects and advantages will appear from the following description and the drawings wherein.

Figure 1:
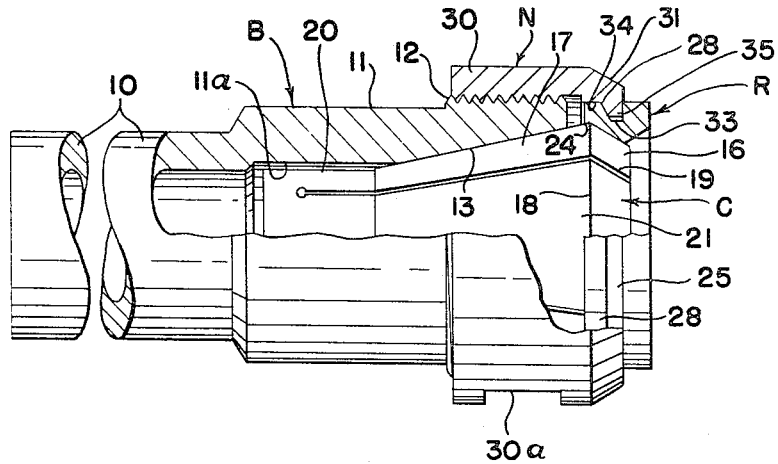
FIG. 1 is a side view partially in elevation and partially in section of one form of collet holder embodying the present invention.

In the drawings, FIGS. 1–5, there is shown one embodiment of the present invention having as primary components the spring collet C, and in the collet holder the hollow body B, the threaded locking collar or nut N and a collet pressure and extracting or ejector ring R, these being represented in assembled relation by FIG. 1.

The collet holder body B includes a back or shank portion 10 of smaller external cylindrical form extending over its major length to be received in a machine spindle; and a collet receiving enlarged end portion 11 terminally externally threaded at 12 to receive thereon the nut N. The enlarged end has female tapered surface 13 as a seat for the corresponding tapered portion of the collet C received therein, which taper terminates inwardly at a counterbore 11a providing clearance for the cylindrical innermost end or skirt 20 of the collet.

The spring collet C here shown is of a generally known externally double-tapered form having a blunt nose taper 16 and a seating taper 17 (here a "sticking" taper) which at 18 intersect in a girdle or circle of maximum diameter lying in a plane perpendicular to the axis of the cylindrical collet bore; and has the usual longitudinal slits 19 at a plurality of equi-spaced locations running inwardly from the front end through the taper portion 16 and 17 to terminate in the cylindrical base 20, thereby defining the leaves or spring jaws of the collet. It will be noted that when the collet is seated in the socket-like holder taper 13, the back end of ring R behind the girdle 18 has a definite clearance from the forward end of the holder body.

At the back of ring R (see also FIGS. 3 and 4) the female taper surface 22 is generally complementary to the collet nose taper 16; but near the rear face of the ring it terminates in an inward circumferential lip 23 providing a short tapered surface 24 corresponding in angularity to the seat taper surface 17 of the collet, whereby the nose portion of the collet may be snapped into engagement within the ring R as permitted by inward flexing of the leaves or colelt jaws 21 as the girdle portion 18 passes through the smaller lip aperture to be received in the internal circumferential groove-like juncture 26 between ring surfaces 22 and 24. The collet surface 16 may actually be a portion of a spherical surface with ring surface 22 complementary thereto, and "taper" as applied to these is to be understood as including such spherical surface portions.

As may be seen more clearly in FIG. 4, the generally cylindrical external surface of the ring R is interrupted by an external circumferential groove 25 in which (as shown in FIG. 1) are engaged in the lug formations 35 of the nut N hereinafter described; and in addition has three equi-spaced like flats 27 extending parallel to the ring axis from the back face to groove 25 (see also FIG. 5), whereby there result three equi-spaced arcuate ring lugs 28 between the flats and between the back face and the groove to provide a back external rim portion of non-circular form.

At the forward end of nut N (see also FIG. 2) beyond the internally threaded generally cylindrical body 30, the reduced nose 31 is relieved at 34 providing in effect an inward lip slightly thinner (to afford a degree of ring float) than the width of groove 25 and defining a non-circular opening complementary in form to the non-circular rear portion of the ring R, that is, having equi-spaced arcuate recesses 32 and intervening flat portions 33, the latter forming radial shoulders or nut lugs 35 corresponding in outline respectively to the ring flats 27 and lugs 28.

Through this nut opening the rear of the ring R may be inserted from the front end of the nut; and a relative turn, say of about 60°, brings the ring lug portions 28 respectively into interengaged position behind the shoulders formed by nut lug portions 35. Either in groove 25 or relieved portion 34 a stop is provided. Thus near the end of one lug 35 a stop pin 37 projects inwardly from the cylindrically relieved ring-lug accommodating area 34 to serve as a stop for the relative rotation of the ring and nut at a position where the ring lugs lie substantially fully behind or in alignment with the nut lugs 35 when the nut is screwed onto the body of the holder, whereby pressure is applied by the nut to the ring, and thereby to the collet nose taper both to seat the collet and constrict it about a tool shank in chucked relation.

With this arrangement cutting tools, for example, which have shanks of size adapted to be received by a collet already in the holder, may be changed merely by backing off the locking nut, and hence ring R by pressure of lugs 35 on the shoulder provided by groove front wall 25a, enough to relieve the tool-securing grip of the collet, pulling out the tool, inserting the second tool, and then tightening up the nut to secure the new tool in the usual manner. The nut exterior may be knurled or as here shown provided with wrench flats 30a for manipulative convenience.

When a tool is to be used requiring a different collet, again the nut is merely backed off to unseat the collet thereby usually bringing the ring lugs at least into approximate coincidence with the arcuate parts 32 of the nut, pin 37 aiding this movement toward coincidences, and withdrawing the ring and collet, and therewith the tool if not previously removed. Then with the collet empty to permit inward flexing of the jaws, the ring may be simply pulled off, snapped onto the new collet, the ring with collet inserted into the holder through the nut opening, a tool inserted, and the nut turned bringing the lugs into interlocked relation and thereafter tightening up on the collet.

Thus there is no need to remove the nut N from the holder body even when the collet is to be changed; only the ring need be handled with the collet; and the entire exchange operation can be completed in a much shorter time, on the order of half the time usually required with comparable collets and holders. Moreover, the axial pressure nut required for effective chucking action is applied over the major part of the area of the ring lugs, rather than through but one of the lugs as generally has happened in certain somewhat similar prior art devices.

Figure 6:
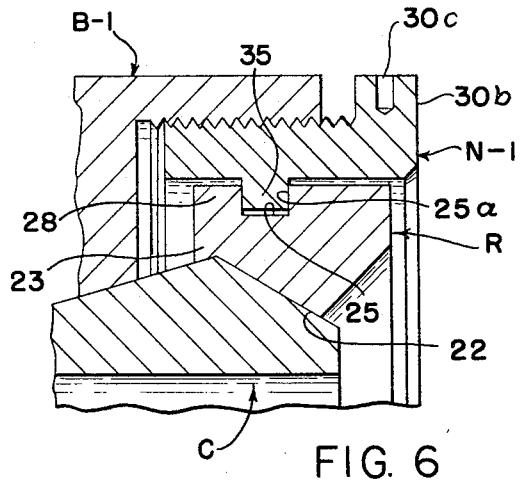
FIG. 6 is a fragmentary detail showing a first modification of the collet holder embodying the present invention.

In FIG. 6 there is shown a modification of the locking nut and collet body. Therein the tool receiving end of the collet body B–1 is internally threaded to receive an externally threaded locking nut or collar N–1 provided at its front or projecting end with means for manually applying tightening or loosening torque, either directly on a knurled region or through a wrench applied to wrench flats or to spanner recesses. There is specifically shown a flange 30b having one or more radial recesses as 30c for engagement by a spanner type wrench. The nut collar is cylindrically bored from both ends to leave an inward lip which is shaped to form a non-circular opening, such as that of the nut N in FIG. 2 providing the spaced lugs 35; while the pressure ring R in essential features is that shown in FIGS. 3 and 4 with a circumferential groove 25 back of which the rim is machined to form lugs 28. The rest of the structure of the modification shown in FIG. 6 is essentially that described for FIGS. 1–5.

It is to be understood that this modification appearing in FIG. 6 relates specifically to the manner of threaded engagement between the body and collet locking element, and is equally applicable to the hereinafter described modifications of FIGS. 7–10, where different forms of pressure rings are used for diverse types of collets along with collet releasing means where applicable.

Where a non-sticking taper is used between the holder

We claim:

1. In combination, a collet having a main external taper adapted to seat in a collet holder and a blunter nose external taper running toward the main taper with a circumferential girdle of maximum collet diameter therebetween and a collet holder including a hollow body having a rear shank portion adapted to be received in a machine spindle, a front portion threaded to receive a locking collar and a collet seating internal taper adapted to receive said collet with the nose taper portion projecting beyond the seating taper, a locking collar in threaded engagement with the threaded front portion of the body and having a lip directed inwardly into the central opening of the collar defining a non-circular opening by which the collet may be passed axially entirely through the collar and a pressure ring with an internal taper corresponding to and bearing on said nose taper of contact with said body and having an external rim portion of non-circular form said rim portion adapted to be received through said opening and upon a rotational shifting relative to said collar adapted to attain an interlocked engagement behind said inward collar lip.

2. In the combination of claim 1, said collet being a spring collet; said internal taper being a sticking taper; said ring having an inward rear lip with internal taper corresponding to said main taper whereby said ring may be pressed onto the nose of said collet into retentive relation; said ring having a circumferentially extending shoulder in axially spaced relation to the said rim portion and engageable by said collar whereby axially directed extracting force may be communicated from said collar to said collet through said ring.

3. The combination of claim 1 wherein one of said ring and collar is provided with a stop formation engageable with the non-circular portion of the other to limit relative rotation at a condition where the non-circular portions are axially interengaged.

4. The combination of claim 1 wherein said collar is internally threaded for engagement with an externally threaded front end portion of said body.

5. The combination of claim 1 wherein said collar is externally threaded for engagement with an internally threaded front end portion of said body.

6. The combination of claim 1 wherein said ring is provided with an internal circumferential lip rearward of its said internal taper and the nose of said collet is provided with an external circumferential groove at the rear of said nose taper wider than and adapted to receive the last said lip; and said collar has a circumferential internal groove spaced rearwardly of the inward collar lip with an expansion ring in the last said groove adapted to engage said ring upon backing off of said collar on said body.

7. The combination of claim 1 wherein the lip of said collar is recessed at a plurality of equi-spaced locations to provide therebetween a plurity of radial shoulders thereby to form said non-circular opening; said rim portion of said ring is defined by an external circumferential groove wider than the thickness of the collar lip to provide a limited degree of ring float relative to said collet; and said rim portion has a periphery complementary in shape to said non-circular opening.

8. For a collet having a main external taper expanding to meet a short blunter nose taper in a circle of maximum collet diameter, a collet holder comprising:
   a holder body having a shank and an externally threaded front end, said end having a bore and internal taper adapted to seat said collet with the collet nose projecting therefrom;
   a pressure ring having an internal taper corresponding to the nose taper of the collet, said pressure ring adapted to bear on said collet through said internal and nose tapers and free of contact of the ring with said body, said pressure ring having an external rim portion providing a plurality of equi-spaced external radially shouldered lugs;
   a locking nut threaded onto said end of the body and having an axial bore forward of the nut threads opening through a nose portion provided with an inward bore lip forward of the body front end and defining an opening complementary in shape to and adapted to receive the ring rim portion therethrough, and also defining shoulder formations behind which said lugs may be engaged upon relative rotational shift of the nut and inserted ring, said opening of the nut being of a size to allow said collet to pass axially therethrough.

9. The collet holder of claim 8 with said internal taper of the body being a sticking taper; said ring having an inward rear lip with internal taper corresponding to said main taper whereby said ring may be pressed onto the nose of a said collet of a spring collet type in retentive relation; said ring having a circumferentially extending shoulder in axially spaced relation to the said external rim engageable by said nut whereby axially directed extracting force may be communicated from said nut to said collet through said ring.

10. The collet holder of claim 8, wherein one of said ring and nut is provided with a stop means engageable with a portion of the other to stop relative rotational shift with the lugs aligned with said shouulder formations.

11. In combination, a collet having a main rear seating portion adapted to seat in a collet holder and a relatively blunt nose external taper; and a collet holder including a hollow body having a rear shank portion adapted to be received in a machine spindle, a front portion threaded to engage a locking collar, and an internal collet seating formation adapted to receive said collet with the nose taper portion projecting beyond the seating formation, a locking collar in threaded engagement with the threaded front portion of the body and having a lip directed inwardly into the central opening of the collar defining a non-circular opening at the front internal periphery of the collar forward of the front end of the body, and a pressure ring with an internal taper corresponding to and bearing on said nose taper free of contact with said body and having a peripheral portion of non-circular external form adapted to be received through said opening and upon a rotational shifting relative to said collar adapted to attain an interlocking engagement behind the collar lip.

12. In the combination of claim 11, said rear seating portion of the collet being cylindrical and said collar having a circumferential external groove on its front portion; a split spring ring in said groove; said collar having an internal forwardly facing shoulder engageable with the split ring for collet extraction.

13. In the combination of claim 11, said collar and pressure ring having surfaces, bearing on each other for said interlocking engagement, of complementary conical shape.

14. In the combination of claim 11, said collet having a circumferential groove in said nose taper; said pressure ring having an internal circumferential groove toward the rear of its said internal taper and at the rear of the last said groove means projecting into, and engageable with the forward wall of, the groove of the collet for collet extraction.

15. In the combination of claim 11, said collar having an internal circumferential groove forward of its threaded portion defining said lip and a forwardly facing shoulder engageable with said pressure ring; said ring having its inner periphery engageable only with the nose taper of the collet.

Figure 3:
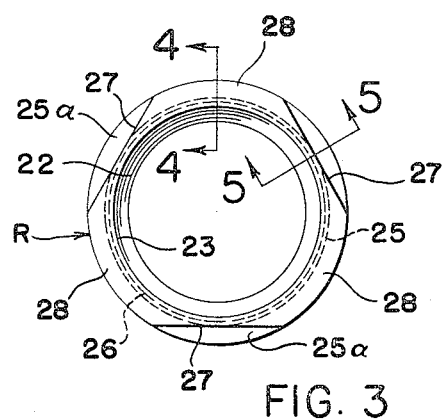
FIG. 3 is a back elevational view of a collet pressure and extracting ring component of the holder.
Figure 4:
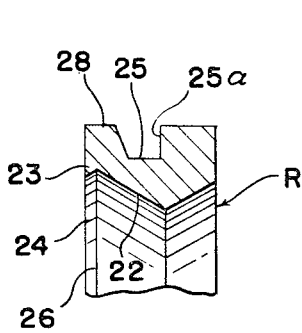
FIG. 4 is a detailed fragmentary longitudinal sectional view of the ring taken as indicated by the line 4—4 in FIG. 3.
Figure 5:
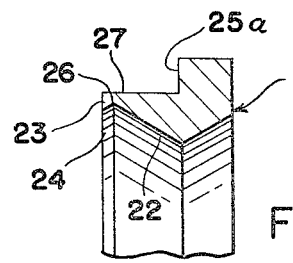
FIG. 5 is a view generally similar to FIG. 4 taken as indicated by the line 5—5 of FIG. 3.
Figure 7:
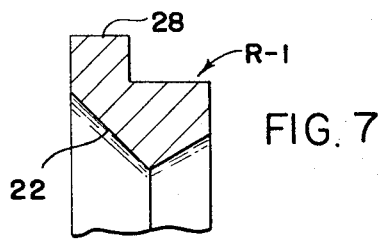
FIG. 7 is a fragmentary detail in section showing a modification of the pressure ring.

16. In the combination of claim 15, said collet being a solid collet, and having an external circumferential groove forward of the pressure ring, and a contractile spring ring engaged in the last said groove for collet extraction by said pressure ring.

body and collet, the ring may be simplified as shown in ring R of FIG. 7 by omission of lip 23 and of the front shoulder formation provided by the groove front wall 25a present in the ring R of FIGS. 1, 3 and 4 since no axially directed collet extracting force is required to be communicated through the ring from the nut to the collet. This form of ring may be used in the environment of FIG. 1 or FIG. 6 where the collet has a non-sticking taper, or that of FIG. 8 for a collet with a sticking taper, or that of FIG. 10 where the collet is cylindrical; and so also even though the collet extracting arrangement of FIGS. 8 or 10 be used with a nut such as that of FIG. 6.

Figure 8:
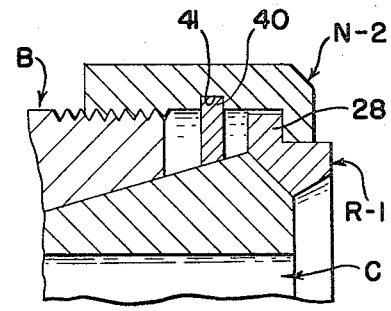
FIG. 8 is a second modification of the tool holder embodying the present invention using a ring such as that of FIG. 7 but adapted for use of a collet with a sticking taper.

In FIG. 8 a ring such as the ring R–1 of FIG. 7 is used; but the nut though generally of the form described with respect to FIGS. 1–5 is provided with an internal groove 41 to receive an expanding spring C-ring 40. The normal internal diameter of the split ring 40 is less than that of the collet girdle; and this ring is located behind the girdle, so that in backing off the nut N–2 the collet is unseated from a sticking condition. The groove 41 is located to permit a little float of the collet between the ring 40 and the ring R–1, so that after the nut N–2 is backed off to release the collet, the ring R–1 is readily turnable to a position where it, and thereafter the collet, may be removed through the nut opening; and so that a new collet and ring R–1 are readily replaced for collet changes.

Figure 2:
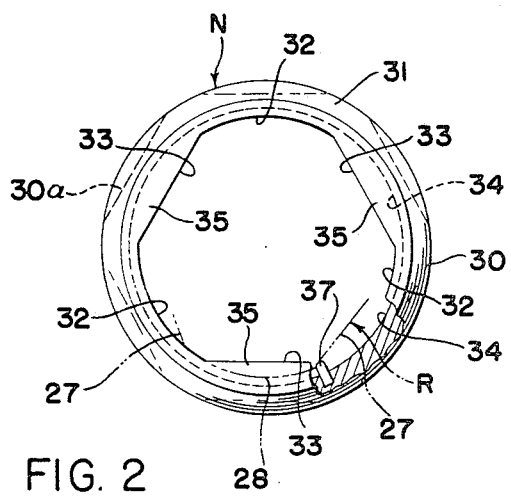
FIG. 2 is a front elevational view of a nut element of the holder.
Figure 9:
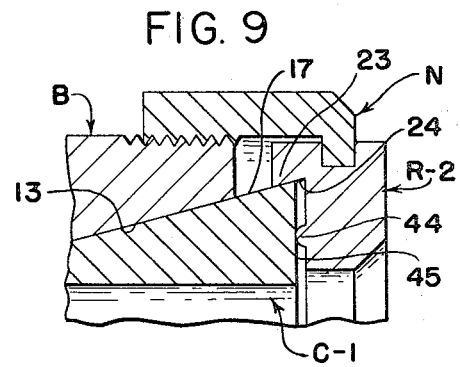
FIG. 9 is again a fragmentary detail in section showing a third modification of the invention for use with collets without a nose taper.

In FIG. 9 the body and nut arrangement is similar to that of FIGS. 1 and 2, and so also the general external shape of the collet pressure and extracting ring R–2. The latter, however, in this case is modified in its collet-engaging portions for a collect C–1 having a flat nose 45, that is, lacking a closing or nose taper, with however a sticking main taper. In place of the tapered surface 22 of the previous forms, the ring R–2 has a radial face provided with a circular bead 44 for applying localized axial pressure to the flat collet end face 45 thereby to drive the collet into the body and derive a collet closing action by the wedging pressure developed between seat 13 and the external collet taper 17. In FIG. 9 there is still retained the lip 23 and taper 24 at the back end of the ring R–2 for circumferential engagement of the region of collet maximum diameter at the collet end. Again the modification specific to FIG. 9 could as well be used where the collet body and locking nut arrangement is that of FIG. 6.

Figure 10:
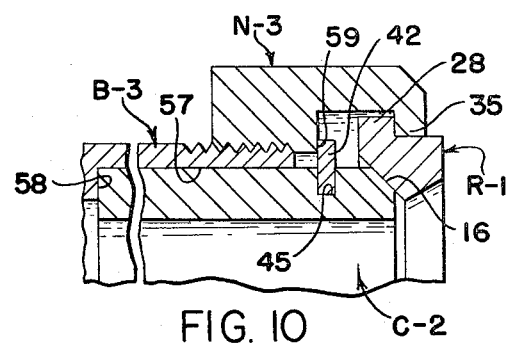
FIG. 10 is a fragmentary detail in section showing a still further modification of the invention for use with cylindrical collets.

For a straight collet, as in collet C–2 of FIG. 10, that is, a collet lacking a seating taper, the holder body B–3 is modified by replacing the tapered seat 13 with a straight bore 57 terminating in a radial shoulder 58 as a stop for the inner end of the collet C–2. The nut N–3, though substantially identical to that of FIGS. 1–2 in external form, and its threaded engagement on the body end, and in relation to the ring of its nose opening with lugs 35, is shown modified slightly in shape or relative dimensional requirements as hereinafter stated. On the collet a circumferential groove 45 accommodates a split ring 42 behind the nose or closing taper 16. The collet is here again drawn into gripping relation on a tool shank by a pressure ring R–1 of the general form shown and described in and with respect to FIG. 7, the collet engaging against the body radial shoulder 58 or other stop means as a reaction surface for developing such force.

The normal external diameter of the ring 42 is such that it will be engaged by a shoulder 59 of the nut N–3 as the latter is backed off from collet clamping relation and also less than a tangent circle through the innermost parts of nut lugs 35, so that the collet with ring engaged thereon may pass through the nut nose opening after removal of the ring R–1. Again the location of the groove 45 relative to the dimension between shoulder 59 and lugs 35 on the nut is such that a certain degree of float is possible in the collet, whereby with release of clamping pressure by backing off the nut, the ring R–1 is readily turnable to the position where it may be removed from the nut, to be followed by removal of the collet with ring 42 thereon.

Figure 11:
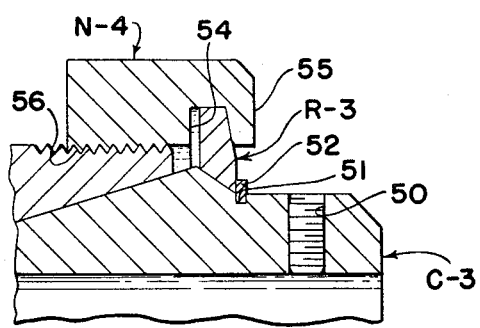
FIG. 11 is a modification with a solid collet.

The arrangement of FIG. 11 shows another ring form and manner of obtaining a collet-extracting engagement between ring R–3 and collet C–3 particularly useful with a solid collet. The general form of the collet C–3 is that previously described say as to FIG. 1, but as a solid collet lacks the longitudinal slits defining the leaves or jaws of a spring collet; and has at least one radial set screw aperture 50, or a plurality of such apertures equi-spaced in angular sense, for securing a tool in the collet bore. In a circumferential groove 51 located forward of the collet girdle, shown at the front end of the nose taper there is disposed a spring snap ring 52 engageable by the ring R–3 for extracting action.

The ring is of simpler form than those previously described in essence being the rear portion of a ring such as R–1 cut off at its forward rim shoulder. That is, R–3 is a simple ring with a tapered central aperture and a non-circular periphery or rim corresponding to the internal peripheral shape of the nose opening in the clamping collar or nut N–4 with which used, so that the collet with ring can be inserted and removed from the front of the nut on the holder by simply turning the nut sufficiently to loosen the collet followed by relative rotation of ring and nut either to engage or disengage the lug-like portions or engageable non-circular portions. The nut is shown in a form such as can be fabricated from a thick disk bored through centrally, internally machined at 54 to form an internal groove at the front portion of the bore; then machined on the inner periphery of the resulting lip 55 at the front of the groove to form the non-circular opening; thereafter threaded at 56 in the rear of the bore; and machining the exterior to provide wrench engageable formations.

In some cases it may be preferable here as well as in the other disclosed arrangements to have conical engaging surfaces on the front lug or rim portion of the ring and on the rearwardly facing wall of the nut groove. This allows the ring in some degree to float, avoiding the possible situation where that wall of the nut groove being nominally radial is actually out of square and would apply clamping force unevenly to the ring and hence to the collet, to result in the back collet taper seating in the holder with uneven pressures. The conical surfaces result in a combination wherein divergencies from the nominal form in the engaging ring and nut surfaces have a minimized or no effect on the back taper.

Figure 12:
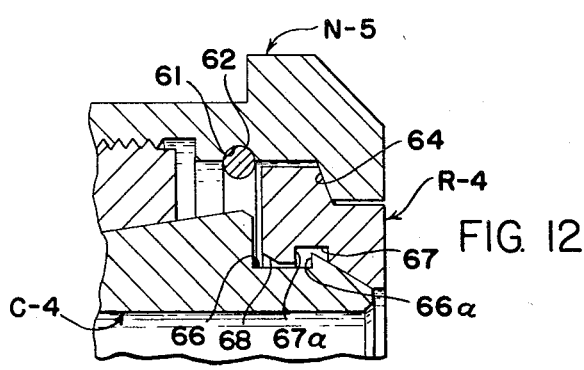
FIG. 12 is a further modification with a spring collet.

The modification of FIG. 12 again includes a spring collet, and is similar to that of FIG. 8, for the ring R–4 eliminates the radially extending portion of the ring forward of the clamping collar or nut N–5 for extraction purposes, and actually the front of the ring is substantially flush with the nut nose for closer approach to the work. The nut N–5 is similar to N–2 in FIG. 8 in having an internal semi-circularly shaped groove 61 in the region between the nut threads and nose, in which is seated an expanding split spring ring 62 of circular section engageable upon slight release turning of the nut with the back of the ring to apply collet extracting force.

However, the shoulder 64 behind the non-circular or lugged nose opening is conical, shown with a 20° slope measured from a radial plane, and the forward surface of the ring R–4 has a complementary male conical shape, preferred for the reasons stated. Further the nose taper of the collect C–4 is interrupted by a circumferential straight walled groove 66 just forward of the collet girdle; while rearwardly of an internal straight walled groove 67 terminating the tapered part of the ring aperture, bearing on the collet nose taper, there is an inward circumferential flange or lip 68 the straight front face 67a of which is engageable with the front wall 66a of the collet groove for extraction purposes; the ring being brought onto the collet as in similar cases previously disclosed, merely by pressing the collet nose into the ring and flexing the collet leaves inwardly. The back face of the ring, i.e., rear portion of 68, is chamfered for clearance to facilitate the collet insertion into the ring.

17. In the combination of claim 11, said collar being externally threaded, said holder body being internally threaded to receive the collar.

18. In the combination of claim 11, said collet having a rear taper on its said main portion seatable in the holder body, said collar having an internal groove at a region spaced behind the said lip of the collar, and an expansion spring ring engaged in said groove and having an inner periphery circumferentially engageable with the rear taper of the collet for collet extraction.

19. In combination, a spring collet having a rear external seating taper adapted to seat in a collet holder and terminating forwardly in a portion of the collet of maximum external diameter; and a collet holder including a hollow body having a rear shank portion and having a front portion threaded to receive a locking collar and a collet seating internal taper adapted to receive said collet with the front part of the collet projecting from the seating taper, a locking collar in threaded engagement with the threaded front portion of the body and having a lip directed inwardly into the central opening of the collar forward of the front end of the body defining a nan-circular opening, and a pressure ring having an external peripheral portion of non-circular form adapted to be received through said opening and upon a rotational shifting relative to said collar adapted to attain an interlocking engagement behind the collar lip; said pressure ring having at its rear an inward lip engageable about the collet portion of a maximum diameter for collet extraction; said pressure ring having, forward of the last said lip, a circumferentially extending formation adapted to engage the front of said collet for applying a collet seating force upon axially inward advance of said collar on said threaded portion of the body, with said ring free of contact with said body.

20. In the combination of claim 19, said collet having a nose portion with a circumferential generally radial face, said pressure ring having, as said circumferentially extending formation, a rearwardly facing circumferential shoulder disposed before said radial face and a circular formation on said shoulder engageable with the radial face for applying clamping force axially to the collet through substantially a line-contact.

References Cited

UNITED STATES PATENTS

| | | | |
|---|---|---|---|
| 2,885,210 | 5/1959 | Sima | 279—49 |
| 2,885,211 | 5/1959 | Sima | 279—59 |
| 3,026,116 | 3/1962 | Marini | 279—48 |
| 3,037,782 | 6/1962 | Chittenden | 279—59 |

ROBERT C. RIORDON, *Primary Examiner.*

H. V. STAHLHUTH, E. A. CARPENTER,
*Assistant Examiners.*